(12) United States Patent
Choi et al.

(10) Patent No.: US 10,853,241 B2
(45) Date of Patent: Dec. 1, 2020

(54) DATA STORING METHOD AND DATA STORING APPARATUS FOR REDUCING POWER CONSUMPTION IN SUDDEN POWER-OFF

(71) Applicants: ESSENCORE Limited, Wanchai (HK); Young Joon Choi, Gyeonggi-do (KR)

(72) Inventors: Young Joon Choi, Gyeonggi-do (KR); Seok Cheon Kwon, Gyeonggi-do (KR)

(73) Assignees: ESSENCORE Limited (HK); Young Joon Choi (KR)

( * ) Notice: Subject to any disclaimer, the term of this patent is extended or adjusted under 35 U.S.C. 154(b) by 236 days.

(21) Appl. No.: 15/990,019

(22) Filed: May 25, 2018

(65) Prior Publication Data

US 2019/0354475 A1    Nov. 21, 2019

(30) Foreign Application Priority Data

May 18, 2018   (KR) .......................... 10-2018-0057151

(51) Int. Cl.
  *G06F 12/02* (2006.01)
  *G06F 1/30* (2006.01)
  *G06F 3/06* (2006.01)
  *G06F 11/14* (2006.01)

(52) U.S. Cl.
  CPC ............ *G06F 12/0253* (2013.01); *G06F 1/30* (2013.01); *G06F 3/0659* (2013.01); *G06F 11/1469* (2013.01); *G06F 12/0238* (2013.01); *G06F 2212/202* (2013.01)

(58) Field of Classification Search
  CPC .. G06F 3/0659; G06F 3/0619; G06F 11/1469; G06F 11/1441; G06F 11/1461
  See application file for complete search history.

(56) References Cited

U.S. PATENT DOCUMENTS

| | | | | |
|---|---|---|---|---|
| 8,725,931 | B1 * | 5/2014 | Kang ................... | G06F 12/0246 710/52 |
| 2012/0254503 | A1 * | 10/2012 | Chiu .................... | G06F 11/1441 711/103 |
| 2013/0042066 | A1 * | 2/2013 | Price ................... | G06F 12/0866 711/119 |
| 2015/0222705 | A1 * | 8/2015 | Stephens ............... | G06F 3/0611 709/214 |
| 2017/0160961 | A1 * | 6/2017 | Khon .................... | G06F 3/0619 |

* cited by examiner

*Primary Examiner* — Jigar P Patel
(74) *Attorney, Agent, or Firm* — Mendelsohn Duneavy, P.C.

(57) ABSTRACT

Disclosed is a data storing method performed by a controller. The method includes storing an attribute value of first data to be written to a nonvolatile memory device in a command queue, determining whether the first data is garbage collection data on the basis of the attribute value when a power interruption occurs, and writing the first data to the nonvolatile memory device according to a result of the determination of whether the first data is garbage collection data or not.

16 Claims, 12 Drawing Sheets

| 0 | CMD1, RADD1,NADD1 |
| 1 | CMD2, RADD2,NADD2 |
| ⋮ | ⋮ |
| 1 | CMD_k, RADD_k, NADD_k |
| 0 | CMD_k+1, RADD_k+1, NADD_k+1 |
| 1 | CMD_k+2, RADD_k+2, NADD_k+2 |

1222            1221

US 10,853,241 B2

DATA STORING METHOD AND DATA STORING APPARATUS FOR REDUCING POWER CONSUMPTION IN SUDDEN POWER-OFF

CROSS REFERENCE TO RELATED APPLICATION

The present application claims priority to Korean Patent Application No. 10-2018-0057151 filed on May 18, 2018, the entire contents of which is incorporated herein for all purposes by this reference.

BACKGROUND OF THE DISCLOSURE

1. Field of the Invention

The present invention relates to a data storing method and a data storing apparatus. More particularly, the present invention relates to a data storing method and apparatus being capable of reducing the consumption of power supplied by an auxiliary power supply when a power interruption event occurs.

2. Related Art

Recently, a paradigm for a computing environment has shifted into ubiquitous computing where computing is available anytime and everywhere. Accordingly, the use of mobile electronic devices such as smart phones, digital cameras, and laptop computers is dramatically increasing. Besides this reason, due to a recent decrease in the price per bit for flash memory devices, resulting from the success of mass production of highly-integrated nonvolatile flash memory devices, data storing apparatuses using a flash memory are rapidly replacing hard disk drives (HDD's).

Generally, a data storing apparatus is equipped with an auxiliary power supply that supplies auxiliary power in case of power interruption. This auxiliary power supply is one factor of increasing the size or cost of a data storing apparatus. Therefore, to obtain a data storing apparatus with a smaller size, it is necessary to reduce the consumption of power supplied by an auxiliary power supply at the time of a power interruption.

SUMMARY OF THE DISCLOSURE

Accordingly, the present invention has been made in view of the problems occurring in the related art, and the present invention is intended to provide a data storing method performed by a controller and comprising: storing an attribute value of first data to be written to a nonvolatile memory device in a command queue; determining whether the first data is garbage collection data or not based on the attribute value of the first data when a power interruption occurs; and writing the first data to the nonvolatile memory device based on a result of the determination of whether the first data is garbage collection data or not.

Additionally, the present invention is intended to provide a data processing apparatus including a buffer memory device in which data is stored, a nonvolatile memory device, and a controller for performing control of storing data according to whether the data is garbage collection data or not when a power interruption event occurs.

According to embodiments of the present invention, only data remaining after excluding garbage collection data from the data stored in the buffer memory device may be stored in the nonvolatile memory device in the case where a power interruption occurs. This reduces the number of bits of data to be stored in the data storing apparatus, resulting in a decrease in the consumption of power supplied by the auxiliary power supply. For this reason, it is possible to reduce the size of the auxiliary power supply, thereby reducing the production cost for the auxiliary power supply.

BRIEF DESCRIPTION OF THE DRAWINGS

FIG. 4 is a diagram illustrating an example of a command queue according to one embodiment of the present invention;

DETAILED DESCRIPTION OF THE PRESENT DISCLOSURE

Hereinafter, preferred embodiments of the present invention will be described with reference to the accompanying drawings.

Figure 1:
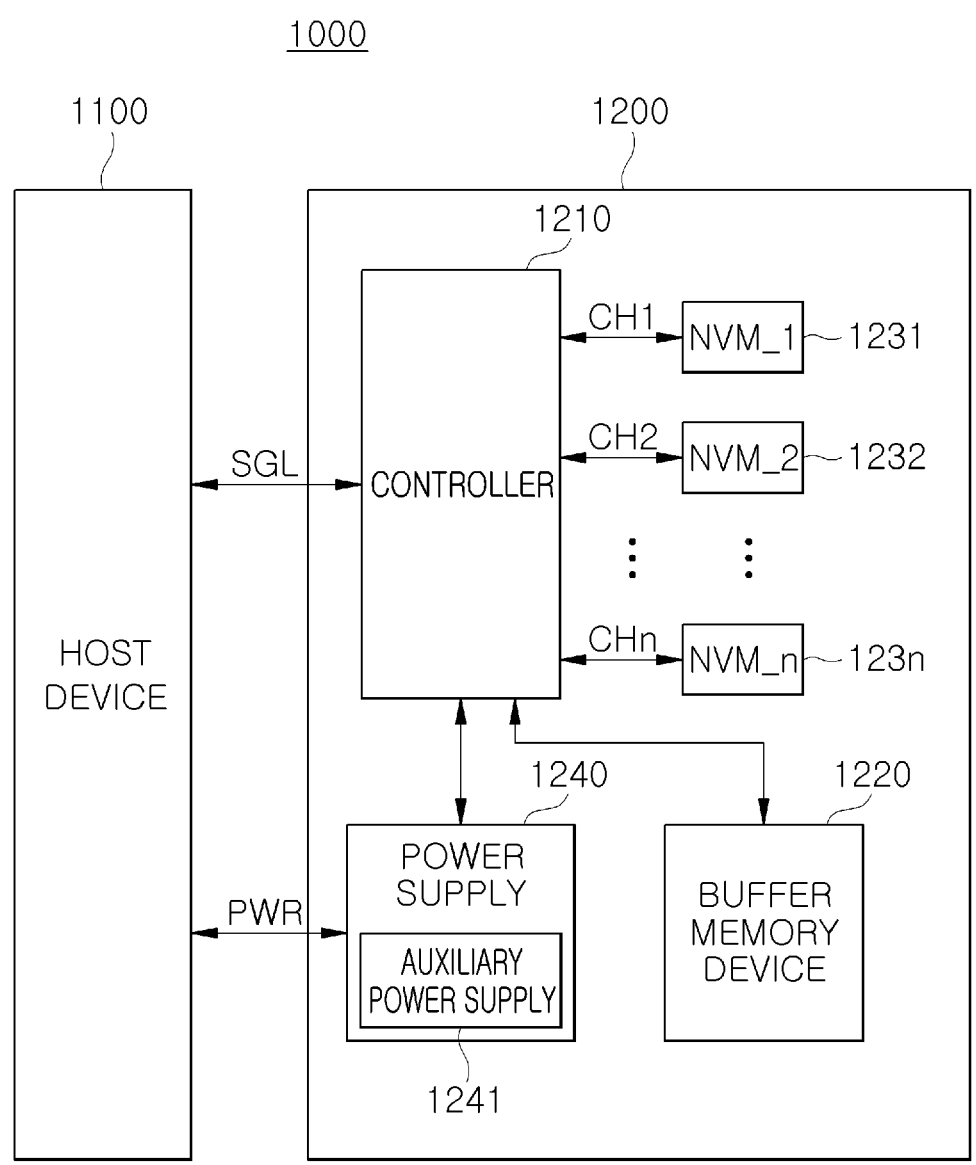
FIG. 1 is a block diagram illustrating an example of a data processing system according to one embodiment of the present invention.

FIG. 1 is a block diagram illustrating an exemplary configuration of a data processing system 1000 according to one embodiment of the present invention. Referring to FIG. 1 1, the data processing system 1000 includes a host apparatus 1100 and a data storing apparatus 1200.

Examples of the host apparatus 1100 include a cellular phone, an MP3 player, a laptop computer, a desktop computer, a game machine, a TV, and an in-vehicle infotainment system.

The data storing apparatus 1200 may be a memory system in which to store data to be accessed by the host apparatus 1100. The data storing apparatus 1200 may be of one type of various types of memory device. For example, the data storing apparatus 1200 may be of any one type among the following: solid-state drives (SSDs); multimedia cards (MMCs) including MMC, e-MMC, RS-MMC, and micro-MMC; secure digital cards (SDs) including SD, mini-SD, and micro-SD; universal storage bus (USG) storage devices; universal flash storage (UFS) devices; card storage devices including personal computer memory card international association (PCMCIA) cards, peripheral component interconnection (PCI) cards, PCI express (PCI-E) cards, compact flash (CF) cards, and smart media cards; and memory sticks.

The data storing apparatus 1200 includes a controller 1210, a buffer memory device 1220, nonvolatile memory devices 1231 to 123n, and a power supply 1240.

The controller 1210 may have access to the nonvolatile memory devices 1231 to 123n in response to an access request issued by the host apparatus 1100.

The controller 1210 is configured to exchange signals SGL with the host apparatus 1100. The signals SGL may include commands, addresses, data pieces, etc. The host apparatus 1100 and the data storing apparatus 1200 may communicate with each other by using an interface technology such as universal flash storage (UFS), parallel advanced technology attachment (PATA), serial advanced technology attachment (SATA), small computer system interface (SCSI), serial attached SCSI (SAS), peripheral component interconnection (PCI), or PCI Express (PCI-E).

The buffer memory device 1220 is configured to temporarily retain data to be subsequently moved to the nonvolatile memory devices 1231 to 123n. The buffer memory device 1220 also may temporarily retain data read out of the nonvolatile memory devices 1231 to 123n. The data temporarily retained in the buffer memory device 1220 is then transmitted to the host apparatus 1100 or the nonvolatile memory devices 1231 to 123n according to the control performed by the controller 1210.

The nonvolatile memory devices 1231 to 123n may be used as a recording medium for use in the data storing apparatus 1200. Each of the nonvolatile memory devices 1231 to 123n is connected to the controller 1210 through a corresponding one of a plurality of channels CH1 to CHn. Each channel may be connected to one or more nonvolatile memory devices. When one channel is connected to more than one nonvolatile memory device, the nonvolatile memory devices connected to the same channel are connected to a single signal bus or a single data bus.

The power supply 1240 supplies electric power PWR to the data storing apparatus 1200. The power supply 1240 may include an auxiliary power supply 1241. The auxiliary power supply 1241 supplies power to the data storing apparatus 1200 for a short time such that the data storing apparatus 1200 can be normally shut down in a power interruption event, i.e., when a sudden power off event occurs.

Figure 2:
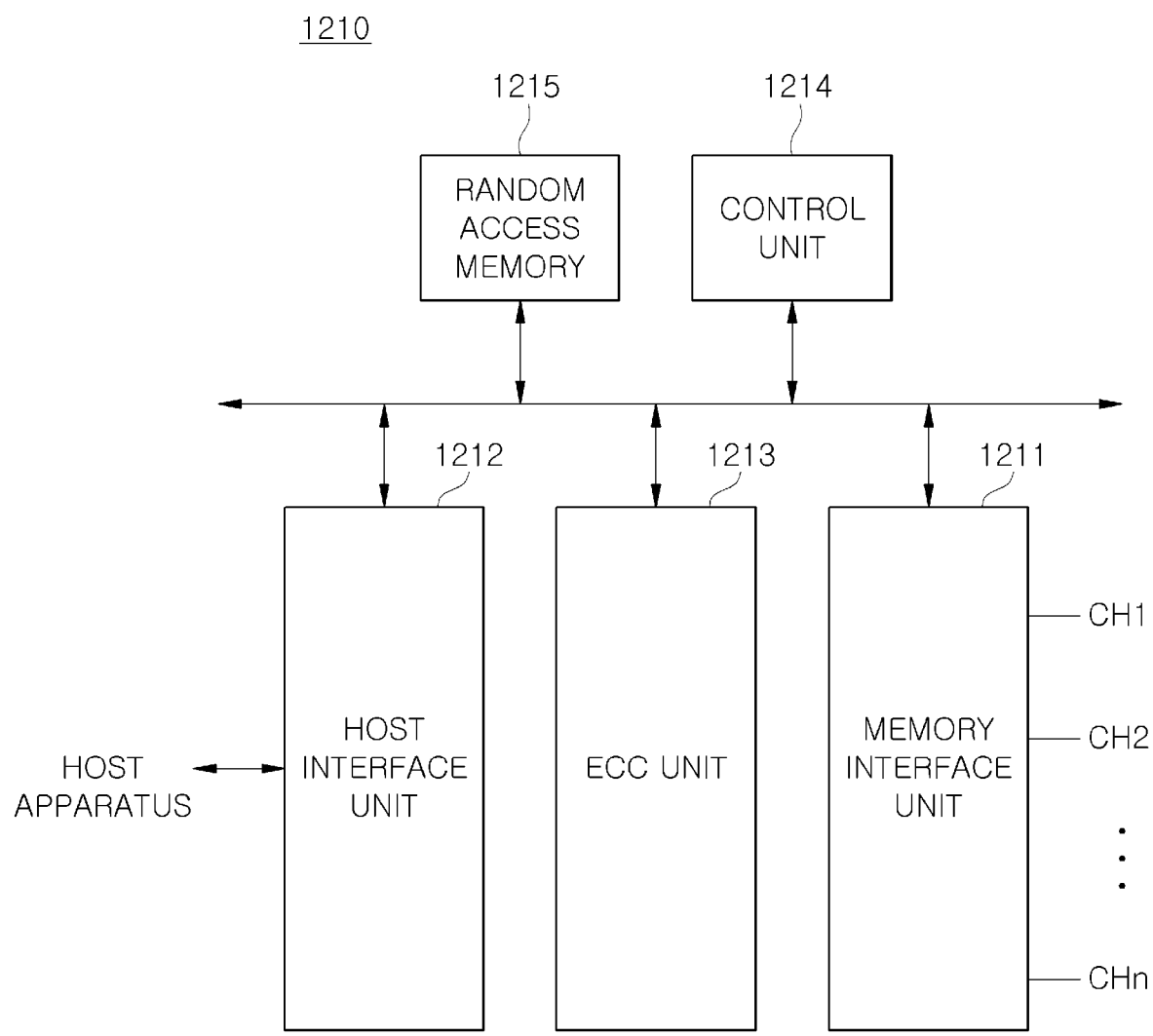
FIG. 2 is a block diagram illustrating an example of a controller of FIG. 1.

FIG. 2 is a block diagram illustrating an exemplary configuration of the controller 1210 illustrated in FIG. 1. Referring to FIG. 2, the controller 1210 includes a memory interface unit 1211, a host interface unit 1212, an error correction code (ECC) unit 1213, a control unit 1214, and a random access memory (RAM) 1215.

The memory interface unit 1211 is configured to provide control signals such as commands and addresses to the nonvolatile memory devices 1231 to 123n. The memory interface unit 1211 is configured to communicate data with the nonvolatile memory devices 1231 to 123n. The control unit 1214 may control the memory interface unit 1211 to transmit the data received from the buffer memory device 1220 to the channels CH1 to CHn. The control unit 1214 also may control the memory interface unit 1211 to transmit the data read out of the nonvolatile memory devices 1231 to 123n to the buffer memory device 1220.

The host interface unit 1212 interfaces the host apparatus 1100 with the data storing apparatus 1200, according to the protocol of the host apparatus 1100. For example, the host interface unit 1212 may communicate with the host apparatus 1100 according to any one of the following protocols: universal flash storage (UFS), parallel advanced technology attachment (PATA), serial advanced technology attachment (SATA), small computer system interface (SCSI), serial attached SCSI (SAS), peripheral component interconnection (PCI), and PCI express (PCI-E). The host interface unit 1212 performs a disk emulation function that enables the host apparatus 1100 to recognize the data storing apparatus 1200 as a bulk memory such as a hard disk drive HDD.

The error correction code (ECC) unit 1213 generates parity data for a data piece among data pieces that are temporarily stored in the buffer memory device 1220 before the data piece is transmitted to the nonvolatile memory devices 1231 to 123n. The generated parity data is then be stored in the nonvolatile memory devices 1231 to 123n along with the transmitted data pieces. The error correction code (ECC) unit 1213 may detect an error of the data read out of the nonvolatile memory devices 1231 to 123n. When the error of the data is within a correctable range, the ECC unit 1213 may correct the error of the data.

The control unit 1214 may analyze and process the signals SGL received from the host apparatus 1100. The control unit 1214 controls the operation of the buffer memory device 1220 and the operation of the nonvolatile memory devices 1231 to 123n according to firmware or software provided to drive the data storing apparatus 1200. The random access memory 1215 is used as an operating memory of the firmware or software.

When a certain power failure occurs, the control unit 1214 determines whether data stored in the buffer memory device 1220 is garbage collection data or not. When the stored data is determined as being garbage collection data, the data in the buffer memory device 1220 is not transmitted to be stored in the nonvolatile memory devices. Only when the data in the buffer memory device 1220 is determined as not being garbage collection data, the data is transmitted so as to be stored in the nonvolatile memory devices. For this reason, at the time of power interruption, since only part of data stored in the buffer memory device 1120 will be transmitted to and stored in the nonvolatile memory devices, the consumption of power supplied by an auxiliary power supply may be reduced.

Figure 3:
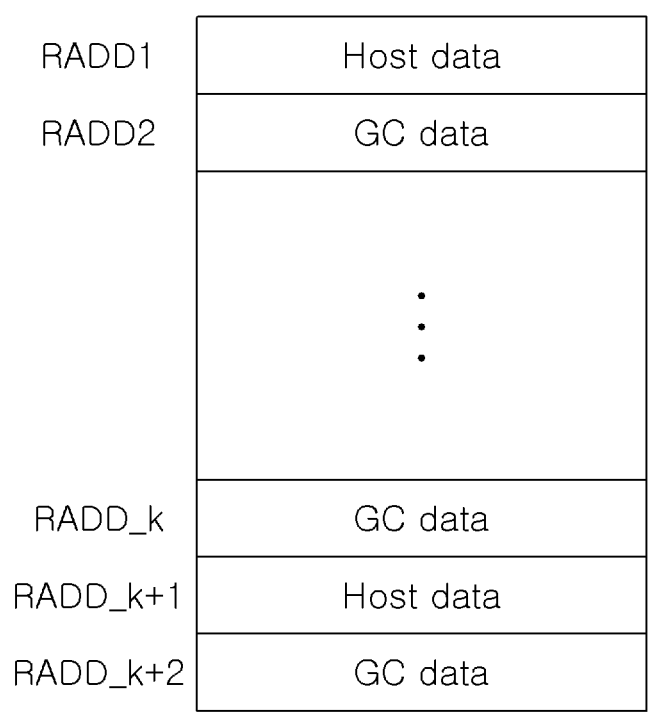
FIG. 3 is a diagram illustrating an exemplary configuration of data pieces stored in a buffer memory device of FIG. 1.

FIG. 3 is a diagram illustrating an exemplary configuration of data stored in the buffer memory device 1220 of FIG. 1. Reference signs RADD1 to RADD_k+2 represent addresses of memory sections in the buffer memory device 1220. The addresses of the memory sections in the buffer memory device 1220 are referred to as buffer addresses.

Referring to FIG. 3, types of data stored in the buffer memory device 1220 include host data and garbage collection (GC) data. In the description of the present specification, the host data may be defined as data transmitted from the host apparatus 1100 and then temporarily retained in the buffer memory device 1220 before it is finally written to the nonvolatile memory devices 1231 to 123n. The garbage collection data means effective data to be moved to empty blocks of a memory array when a garbage collection function described later is performed.

The data transmitted from the host apparatus 1100 to the data storing apparatus 1200 is temporarily in an in-flight state on a data transmission path before the data is written to the nonvolatile memory devices 1231 to 123n where the data is retained in a nonvolatile state. For fast processing of the data processing system, the intermediate in-flight state of data is found, for example, in the buffer memory device 1220 in the data storing apparatus 1200, the random access memory 1215 in the controller 1210, the data bus or the interface device, and an internal circuit of the nonvolatile memory device 1231 to 123n. In FIG. 4, the host data may be data being in the in-flight state. It takes a predetermined time for data to be transmitted from the host apparatus 1100 and to be completely written to the data storing apparatus 1200 via an interface layer that interfaces commands between the host apparatus 1100 and the data storing apparatus 1200, after the interface layer sends a notification indicating data reception to the host apparatus 1100. When a power failure occurs in the middle of transmission of data from the host apparatus 1100 to the data storing apparatus 1200 after the host data receives the notification indicating data reception from the interface layer, an error occurs in integrity and consistency of data for which the host apparatus 1100 is notified of completion of writing. This may cause a critical failure in the host apparatus 1100. According to the present embodiment of the invention, when a power interruption event occurs, the data processing system can complete writing of data transmitted from the host apparatus to the data storing apparatus 1200 by using power supplied by a built-in auxiliary power supply (i.e., a power supply 1241) and may not store the garbage collection data in the nonvolatile memory devices in the data storing apparatus at this time.

FIG. 4 is a diagram illustrating an example of a command queue including commands to be performed by the controller unit 1214 of FIG. 2 and addresses of data to be written. The command queue may be stored in the random access memory (RAM) 1215, and the random access memory 1215 may be configured with a static random access memory (SRAM). The command queue may include a command region 1221 and an attribute region 1222.

In the command region 1221, commands to be sequentially performed by the control unit 1214 are successively stored. For example, referring to FIG. 3, the control unit 1214 will sequentially perform a first command CMD1, a second command CMD2, . . . , and a $k+2^{-th}$ command CMD_k+2. In the command region 1221, the buffer addresses RADD1 to RADD_k+2 corresponding to the respective commands CMD1 to CMD_k+2 and memory addresses NADD1 to NADD_k+2 of the nonvolatile memory 1231 to 123n also may be stored. Therefore, the control unit 1214 can read data out of the buffer memory device 1220 and write the data to the nonvolatile memory 1231 to 123n.

Stored in the attribute region 1222 include the attribute values of the corresponding data pieces stored in the buffer memory. For example, when the buffer address RADD1 is stored on the first line of the command queue of FIG. 4, and when host data is stored in the buffer address RADD1 of the buffer memory device 1220 of FIG. 3, the attribute value "0" may be stored on the first line of the attribute region 1222. In addition, when the buffer address RADD2 is stored on the second line of the command queue of FIG. 4 and when garbage collection data is stored in the buffer address RADD2 of the buffer memory device 1220 of FIG. 3, the attribute value "1" may be stored on the second line of the attribute region 1222. In this way, the attribute value "1" is stored on the k+2-th line of the attribute region 1222 and the attribute value "0" is stored on the k+1-th line of the attribute region 1222. These attribute values are suggested only for illustrative purposes in the present embodiment, and other values may be used as the attribute value.

The control unit 1214 determines whether to perform a command on the basis of the corresponding attribute value stored in the attribute region 1222. For example, the control unit 1214 may perform a command when the attribute value thereof is zero (0). On the other hand, when the attribute value is one (1), the control unit 1214 may not perform the corresponding command and may delete the corresponding command from the command queue.

Figure 5:
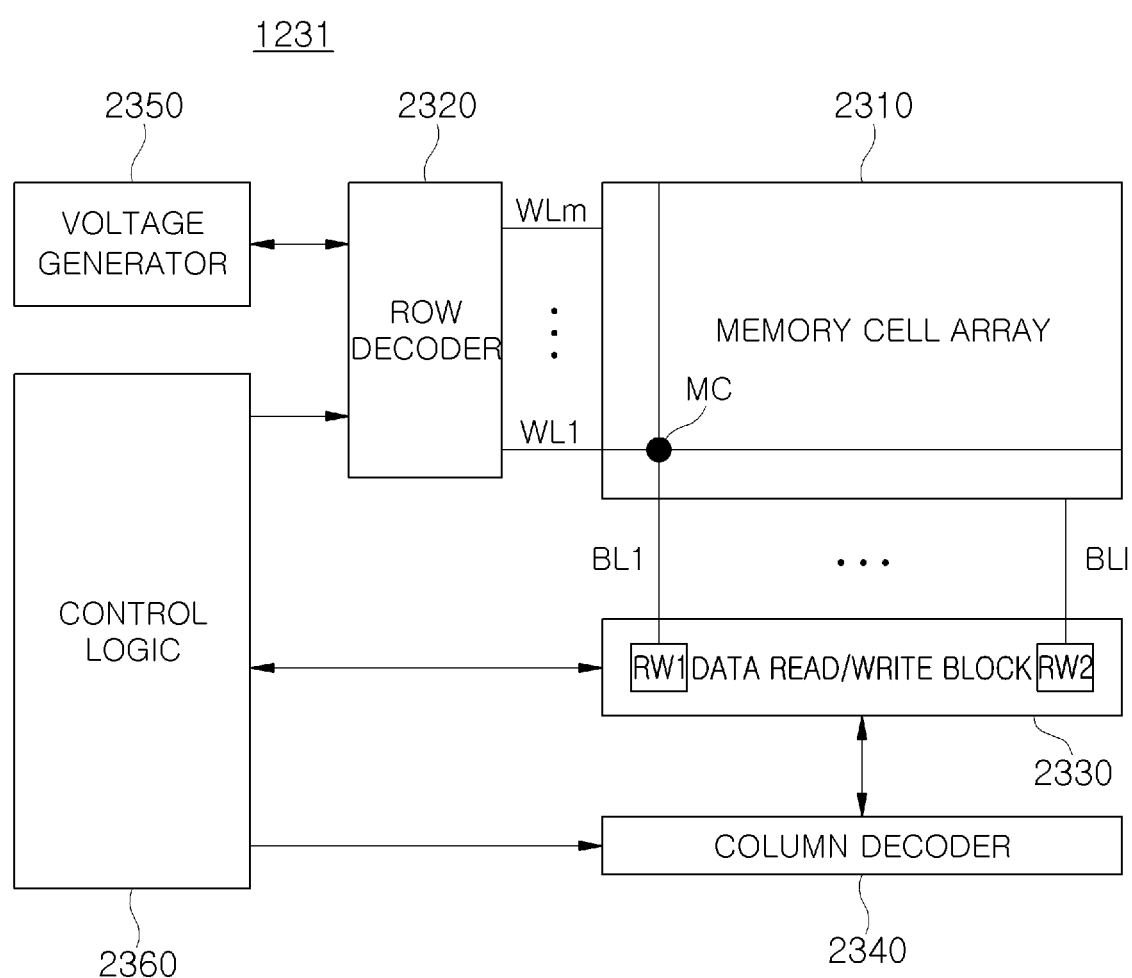
FIG. 5 is a block diagram illustrating an exemplary configuration of a nonvolatile memory device of FIG. 1.

FIG. 5 is a block diagram illustrating the nonvolatile memory device 1231 of FIG. 1. Although FIG. 4 illustrates only the nonvolatile memory device 1231, the other nonvolatile memory devices 1232 to 123n may have the same structure as the nonvolatile memory device 1231.

Referring to FIG. 5, the nonvolatile memory device 1231 includes a memory cell array 2310, a row decoder 2320, a column decoder 2340, a data read/write block 2330, a voltage generator 2350, and a control logic unit 2360.

The memory cell array 2310 includes memory cells MC each being disposed at a position at which one of word lines WL1 to WLm and one of bit lines BL1 to BL1 cross each other.

The row decoder 2320 is connected to the memory cell array 2310 via the word lines WL1 to WLm. The row decoder 2320 operates according to the control command supplied by the control logic unit 2360. The row decoder 2320 will decode addresses supplied from an external device (not illustrated). The row decoder 2320 selectively drives the word lines WL1 to WLm according to the result of the address decoding. For example, the row decoder 2320 enables or disenables a word line voltage generated by the voltage generator 2350 to be transferred to the word lines WL1 to WLm.

The data read/write block 2330 is connected to the memory cell array 2310 via the bit lines BL1 to BL1. The data read/write block 2330 includes read/write circuits RW1 to RW1 corresponding to the bit lines BL1 to BL1. The data read/write block 2330 operates according to the control command of the control logic unit 2360. The data read/write block 2330 functions as a write driver and a sense amplifier according to operation modes. For example, the data read/write block 2330 will function as the write driver that writes data supplied by an external device to the memory cell array 2310 in write operation mode. In another example, the data read/write block 2330 functions as the sense amplifier that reads data out of the memory cell array 2310 in read operation mode.

The column decoder 2340 operates according to the control command of the control logic unit 2360. The column decoder 2340 will decode addresses supplied by an external device. The column decoder 2340 connects the read/write circuits RW1 to RWn of the data read/write block 2330, which respectively correspond to the bit lines BL1 to BLn, with data input/output lines (also, referred to as input/output buffers) on the basis of the result of the address decoding.

The voltage generator 2350 generates an internal voltage to be used for internal operation of the nonvolatile memory device 1231. The voltages generated by the voltage generator 2350 will be applied to the memory cells disposed in the memory cell array 2310. For example, a programming voltage generated in a programming operation mode will be applied to the word lines connected to the memory cells on which a programming operation is to be performed. In another example, an erasing voltage generated in an erasing operation mode will be applied to the wells of the memory cells on which an erasing operation is to be performed. In another example, a reading voltage generated in a reading operation mode will be applied to the word lines connected to the memory cells on which a reading operation is to be performed.

The control logic unit 2360 controls the overall operation of the nonvolatile memory device 1231 according to a control signal supplied by an external device. For example, the control logic unit 2360 will perform operations with respect to the nonvolatile memory device 1231, for example, reading, writing, erasing operations with respect to the nonvolatile memory device 1231.

Figure 6:
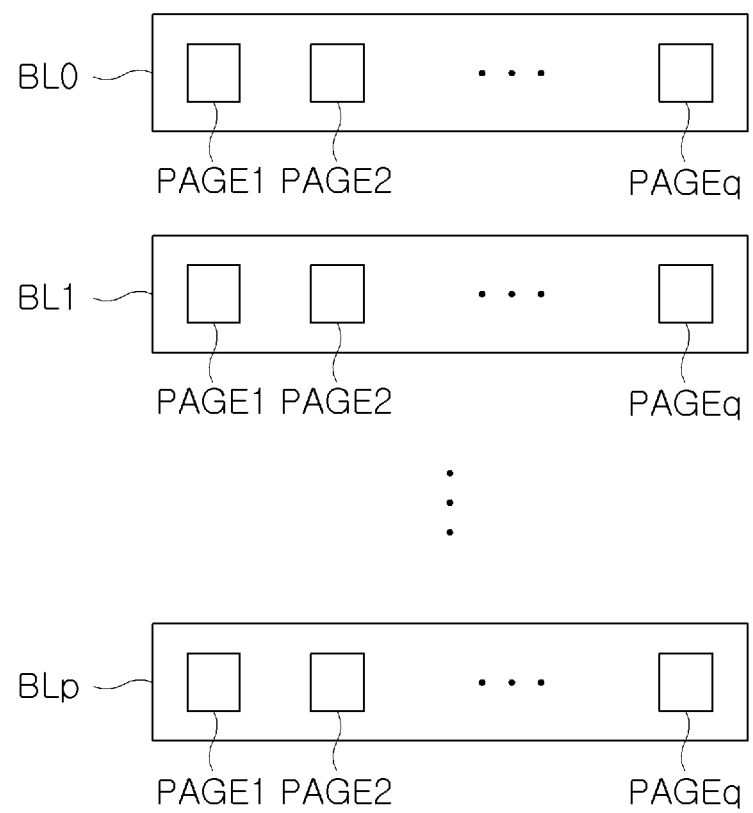
FIG. 6 is a block diagram illustrating an exemplary configuration of a memory cell array of FIG. 5.

FIG. 6 is a diagram illustrating the structure of the memory cell array 2310 of FIG. 5.

The memory cell array 2310 is composed of a plurality of memory cell blocks BL0 to BLp. Each of the memory cell blocks BL0 to BLp is composed of a plurality of pages PAGE1 to PAGEq. In each of the nonvolatile memory device 1231 to 123n, the reading and writing operations are performed on a per-page basis and the erasing operation is performed on a per-block basis.

The nonvolatile memory devices 1231 to 123n do not support an overwrite function. Accordingly, in order to update data stored in a specific page in each of the nonvolatile memory devices 1231 to 123n, effective data (also called effective pages) in a current block to which the data-updating target page belongs is first copied into another block existing as an empty block, and then the data in the former block (current block) needs to be deleted. This operation requires copying (reading and writing) of multiple pages and deleting of the target block, thereby deteriorating the overall performance of a flash memory.

In order to prevent the deterioration in the performance of a flash memory, a software component such as a flash translation layer (FTL) is used to interface the host apparatus with the flash memory. The FTL has two primary functions including an address mapping function and a garbage collection function. When the host apparatus issues an overwrite command to overwrite data to a certain page (original page), the address mapping function writes the data requested to be overwritten to the original page to a different empty page instead of directly writing the data to the original page, thereby reducing computation for copying and deleting. To implement the address mapping function, an address mapping table is retained in an additional memory configured with an SRAM or a DRAM. Thus, logical addresses (also called virtual addresses) provided by the host apparatus are mapped on physical address of the flash memory. The address mapping technique has an advantage of reducing the computation for reading, writing, and deleting which are required for data overwriting, but has a drawback of generating ineffective pages in which ineffective data prior to current data (recently input data) is written.

In order to prevent wasting of a memory space of a flash memory, which attributes to the presence of the ineffective pages in the flash memory, the FTL needs to periodically delete the ineffective pages. This periodic deletion of the ineffective pages is called the garbage collection function.

The garbage collection function or technique is performed in a manner of first selecting specific blocks (to-be-replaced blocks) of all of the memory blocks of the flash memory and copying effective pages within the selected blocks into empty pages within a different empty block. At this time, since the ineffective pages retain old data (ineffective data), the ineffective pages will not be copied. After all the effective pages are copied into an empty block, the selected blocks from which the effective data is copied will be deleted. After the deletion of the selected blocks, all the pages within the to-be-replaced blocks become empty pages. Therefore, it is possible to recover the space of a flash memory through the garbage collection process, thereby preventing the space of the flash memory from being wasted.

When trouble occurs in the supply of the electric power PWR, the data storing apparatus 1200 may use only auxiliary power stored in the auxiliary power supply 1241 for the data processing or storing process. The auxiliary power supply 1241 includes a capacitor that supplies electric charges required for completion of writing of data, which is in flight to the data storing apparatus 1200, to the nonvolatile memory devices 1231 to 123n. The amount of electric charges required for completion of writing the in-flight data to the nonvolatile memory devices is determined based on the total amount of the in-flight data and the current consumed by elements of the data storing apparatus 1200, and it typically takes several ms to complete writing of the in-flight data to the nonvolatile memory devices. The cost of the capacitor accounts for a significant proportion of the total cost of a data storing apparatus. Therefore, it is necessary to reduce the cost of the capacitor provided in the auxiliary power supply.

In the present embodiment, the control unit 1214 of the controller 1210 can selectively write only the host data which means data from which garbage collection data is excluded among data pieces stored in the buffer memory device 1220, to the nonvolatile memory devices 1231 to 123n when trouble occurs in the power PWR, thereby being capable of reducing the consumption of power supplied by the auxiliary power supply. Since the garbage collection data remains in the nonvolatile memory devices 1231 to 123n, although the garbage collection data in the buffer memory device 1220 is not written to the nonvolatile memory device 1231 to 123n, neither data integrity is affected nor the address mapping is changed. Accordingly, in the present embodiment, the control unit 1214 is configured not to perform writing of garbage collection data.

Figure 7A:
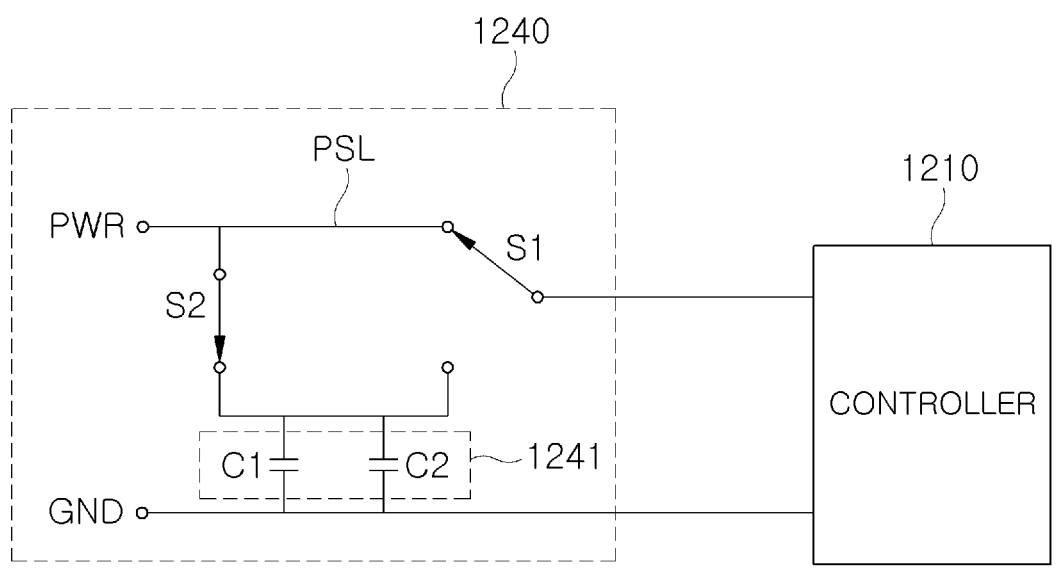
FIGS. 7A and 7B are diagrams illustrating an exemplary configuration of a power supply of FIG. 1.
Figure 7B:
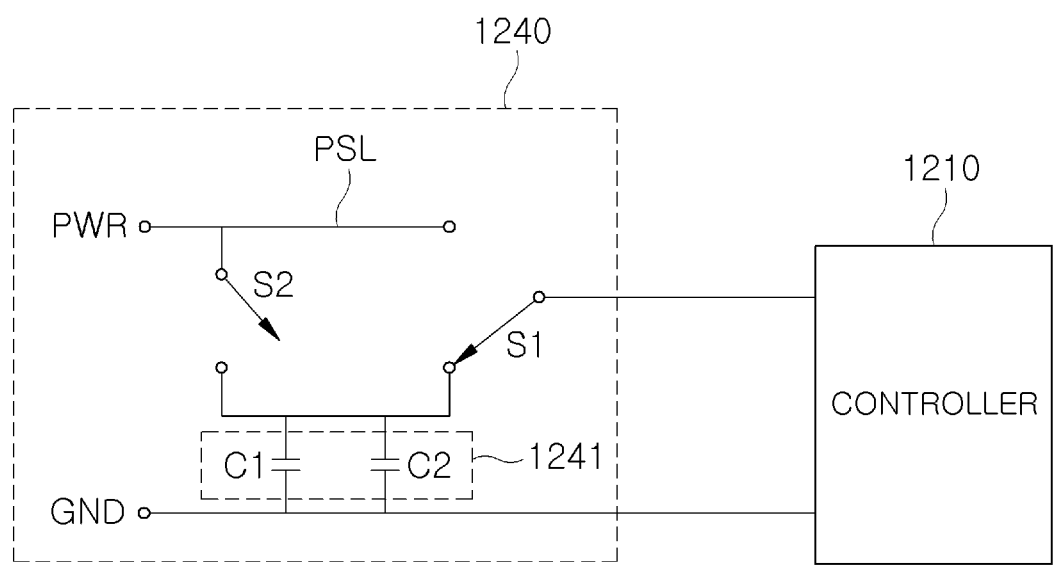

FIGS. 7A and 7B are diagrams illustrating exemplary configurations of the power supply 1240 of FIG. 1. FIG. 7A illustrates connection states of switches S1 and S2 during a normal operation state and FIG. 7B illustrates connection states of the switches S1 and S2 when a power interruption occurs.

Referring to FIGS. 7A AND 7B, the power supply 1240 includes a power supply line PSL, first and second switches S1 and S2, an auxiliary power supply 1241. The auxiliary power supply 1241 may include a plurality of capacitors C1 and C2. Although only two capacitors C1 and C2 are illustrated in FIGS. 6A and 6B, the number of capacitors in the present invent invention is not limited thereto.

The power supply line PSL transfers the power PWR supplied by the host apparatus 1100 to the interior of the power supply 1240.

The first switch S1 switches such that the controller 1210 is connected to any one of the power supply line PSL and the auxiliary power supply 1241. For example, during the normal operation, as illustrated in FIG. 7A, the power supply line PSL and the controller 1210 are connected to each other. On the other hand, as illustrated in FIG. 7B, the auxiliary power supply 1241 and the controller 1210 are connected to each other when a power interruption occurs.

The second switch S2 switches such that the power supply line PSL and the auxiliary power supply 1241 are connected to or disconnected from each other. For example, during the normal operation, as illustrated in FIG. 7A, the power supply line PSL and the auxiliary power supply 1241 are connected to each other. However, when a power interruption occurs, as illustrated in FIG. 7B, the power supply line PSL and the auxiliary power supply 1241 are disconnected from each other.

Therefore, in a case where the power PWR is normally supplied from the host apparatus 1100, the power PWR can be supplied to the controller 1210 and to the auxiliary power supply 1241, so that the capacitors C1 and C2 can be charged during this period. However, when the interruption of the power PWR from the host apparatus 1100 occurs, the charging of the capacitors C1 and C2 of the auxiliary power supply 1241 is stopped and the charges stored in the capacitors C1 and C2 of the auxiliary power supply will be supplied to the controller 1210.

Figure 8:
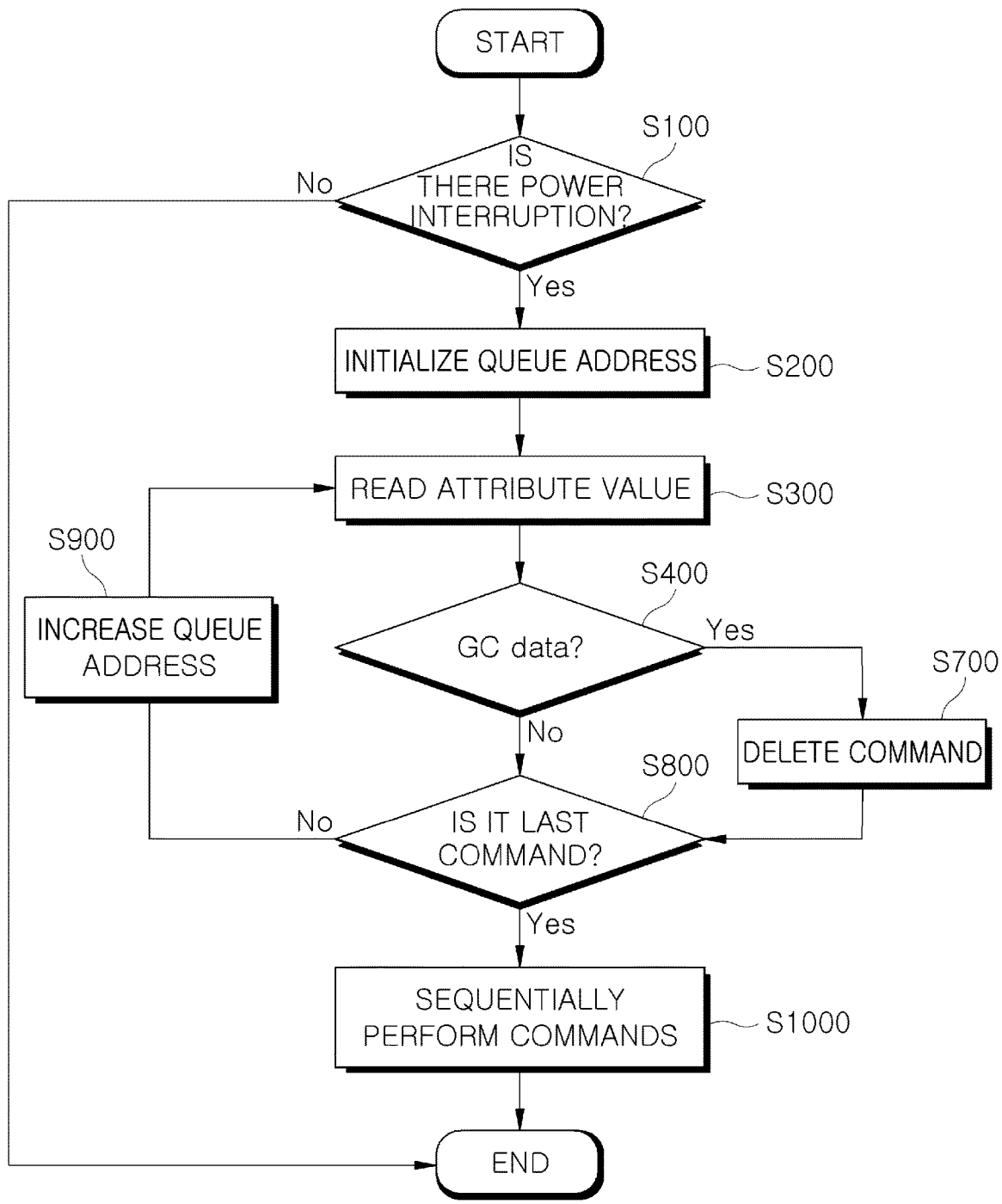
FIG. 8 is a flowchart illustrating an operation sequence of a controller according to one embodiment of the present invention.

FIG. 8 is a flowchart illustrating an operation sequence of the control unit 1214 according to one embodiment of the present invention.

Referring to FIG. 8, the control unit 1214 determines whether a power interruption occurs in Step S100. When it is determined that the power interruption occurs (YES in Step S100), proceeding to the next step is performed. On the other hand, when it is not determined that the power interruption occurs (NO in Step S100), the control process ends. The control unit 1214 directly detects the power interruption by measuring the power PWR or indirectly detects by receiving a signal indicating the power interruption from an additional power interruption sensing device. The control unit 1214 may determine the occurrence of power interruption periodically.

When it is determined that the power interruption occurs (YES in Step S100), the control unit 1214 initializes the addresses (hereinafter, referred to as queue address) in a command queue in Step S200. An earliest address in the command queue may be the first address present in the command queue or the address of a command which is in the middle of processing at the time when a power interruption occurs.

Next, the control unit 1214 reads an attribute value at the earliest address in the command queue in Step S300.

Next, the control unit 1214 determines whether data to be written (hereinafter, referred to as a write target data) is garbage collection data on the basis of the attribute value in Step S400. When the write target data is determined as being garbage collection data (YES in S400), the control unit 1214 deletes the command corresponding to the write target data from the command queue in Step S700. When the write target data is not garbage collection data (NO in S400), the control unit 1214 further determines whether the command corresponding to the write target data is the last command in the command queue in Step S800. When the command is determined as not being the last command (NO in Step S800), the control unit 1214 increases the value of the address in the command queue in Step S900. That is, the control process shifts to the next address in the command queue. The processing of the command corresponding to the increased address (i.e., next address) is the same as the processing of the earliest address. In this way, the control unit 1214 deletes commands corresponding to data pieces determined as being garbage collection data from the command queue, thereby retrofitting the command queue. Finally, the control unit 1214 sequentially reads the commands in the retrofitted command queue in Step S1000. That is, the control unit 1214 reads data out of the buffer memory device 1220, writes the read data to the nonvolatile memory devices 1231 to 123n, and ends the control process.

Figure 9:
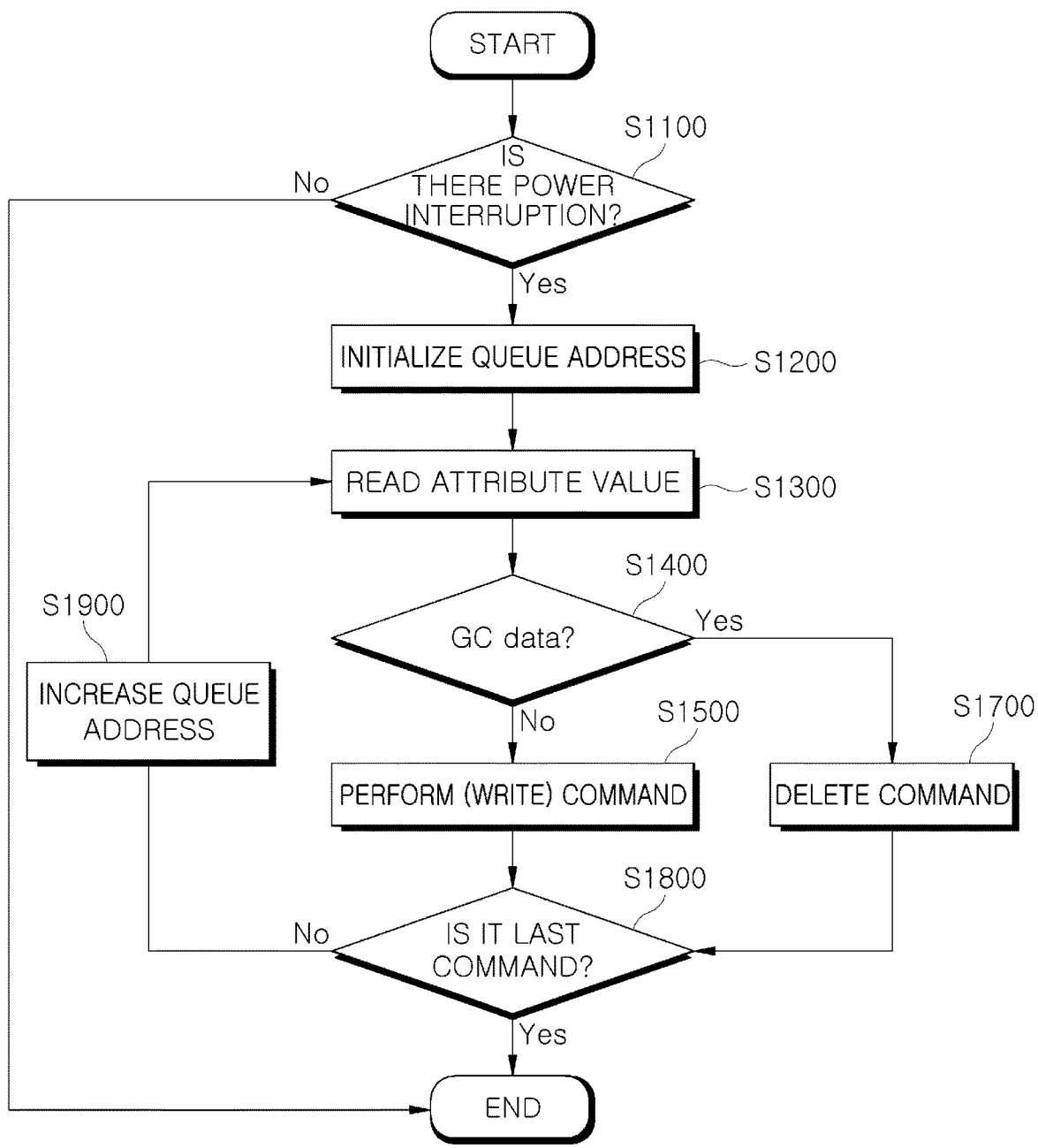
FIG. 9 is a flowchart illustrating an operation sequence of a controller according to another embodiment of the present invention.

FIG. 9 is a flowchart illustrating an operation sequence of the control unit 1214 according to another embodiment of the present invention.

In FIG. 9, Step S1100 of determining whether a power interruption occurs, Step S1200 of initializing a queue address, Step S1300 of reading an attribute value of a command from a command queue, and Step S1400 of determining whether data that is read is garbage collection data are performed in the same way as S100, S200, S300, S400 of FIG. 8, respectively.

When a write target data is garbage collection data (YES in Step S1400), the control unit 1214 does not perform the command corresponding to the earliest address and deletes this command from the command queue in Step S1700. When the write target data is not garbage collection data (NO in Step S1400), the control unit 1214 performs the command corresponding to the earliest address, i.e., writes a copy of the corresponding data in the buffer memory device 1220 to the nonvolatile memory devices 1231 to 123n in Step S1500. That is, only for the data that is determined as not being garbage collection data, the control unit 1214 writes the write target data to the nonvolatile memory devices 1231 to 123n.

Next, the control unit 1214 determines whether a current queue address (i.e., the earliest address in the command queue) is the last address in Step S1800. When the current queue address is determined as being the last address (YES in S1800), the control unit 1214 ends the process. When the current queue address is determined as not being the last address (NO in Step S1800), the control unit 1214 increases the value of the queue address in Step S1900. That is, the control process shifts to the next address in the command queue. After the queue address is increased, the same processing as that performed for the earliest address is repeated.

Figure 10:
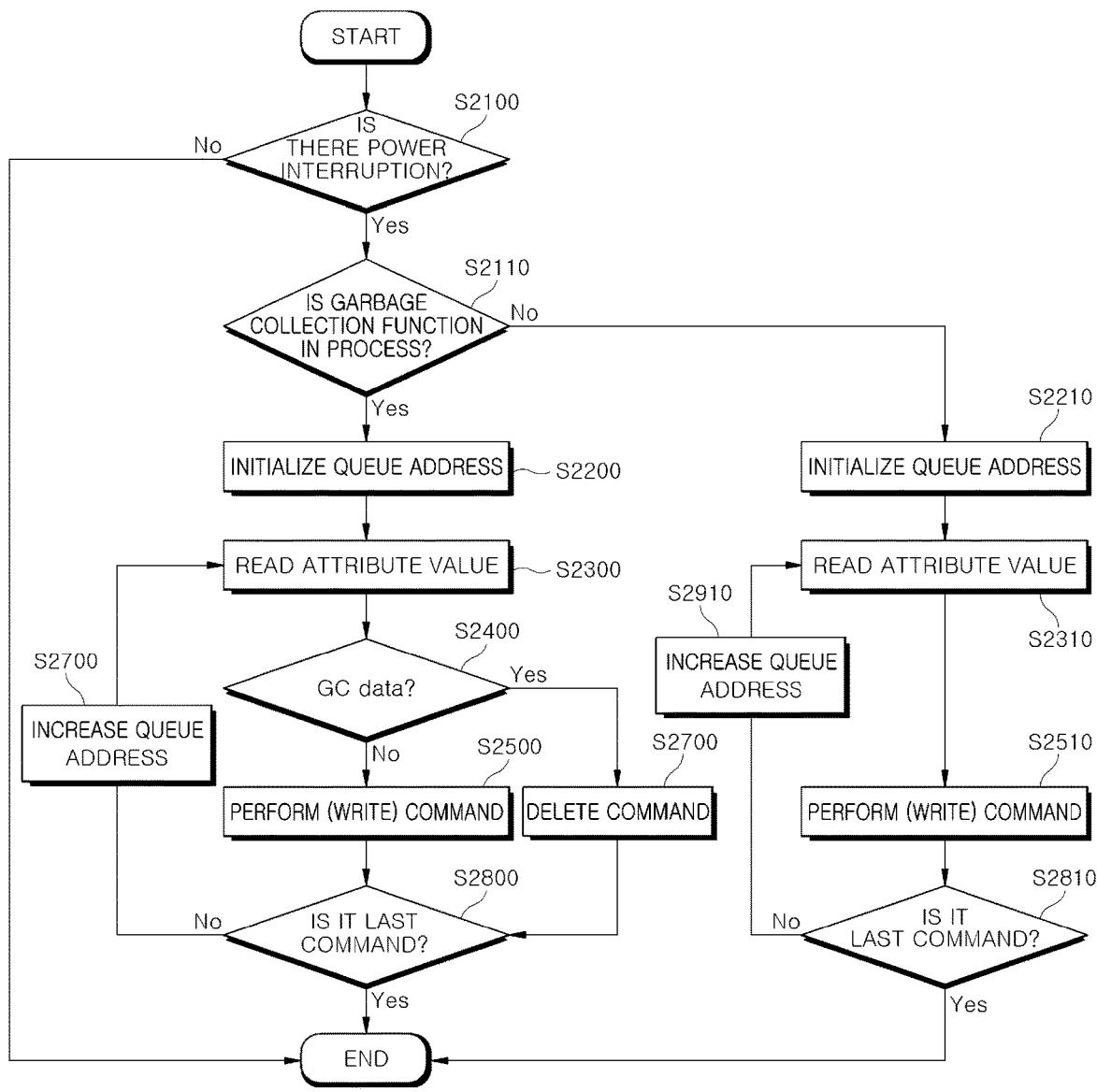
FIG. 10 is a flowchart illustrating operation of a control unit according to a further embodiment of the present invention.

FIG. 10 is a flowchart illustrating an operation sequence of the control unit 1214 according to a further embodiment of the present invention.

Referring to FIG. 10, Step S2100 of determining whether a power interruption occurs is performed in the same way as in Step S100 of FIG. 8.

In the present embodiment, when a power interruption occurs, the control unit 1214 determines whether a garbage collection function is in process in Step S2110. When it is determined that the garbage collection function is not in process (NO in Step S2110), Steps S2200, S2300, S2400, S2500, S2700, S2800, and S2900 are performed in the same way as in Steps of S1200, S1300, S1400, S1500, S1700, S1800, and S1900 of FIG. 9, respectively.

When it is determined that the garbage collection function is in process at the time when the power interruption occurs (YES in Step S2110), the control unit 1214 does not perform a determination of whether the write target data is garbage collection data, but reads data out of the buffer memory device 1220 and writes the read data to the nonvolatile memory devices 1231 to 123n.

Specifically, when it is determined that the garbage collection function is in process at the time when the power interruption occurs (YES in Step S2110), the control unit 1214 initializes the queue address in Step S2200 in the same way as Step S2200.

Next, the control unit 1214 processes the earliest command in the command queue. That is, the control unit 1214 reads data out of the buffer memory device 1220, and writes the read data to the nonvolatile memory devices 1231 to 123n in Step S2510.

Next, the control unit 1214 determines whether the current queue address (i.e., earliest queue address in the command queue) is the last queue address in Step S2810. When the current queue address is the last queue address (YES in Step S2810), the control unit 1214 ends the process. On the other hand, when the current queue address is not the last queue address (NO in Step S2810), the control unit 1214 increases the queue address at Step S2900. Next, the control unit 1214 performs the same processing for the increased queue address (i.e., the next queue address) as that performed for the earliest queue address.

In the present embodiment, when a power interruption occurs and the garbage collection function is in process at the time of power interruption, the control unit 1214 writes all the data pieces stored in the buffer memory device 1220 to the nonvolatile memory devices to complete the garbage collection function. On the other hand, when the garbage collection function is not in process at the time of power interruption, the control unit 1214 writes only data pieces other than garbage collection data among all the data pieces stored in the buffer memory device 1220 to the nonvolatile memory devices. With this control operation, it is possible to ensure a reliable operation process of the garbage collection function by completing the ongoing garbage collection function when a power interruption occurs in the middle of processing of the garbage collection function.

Figure 11:
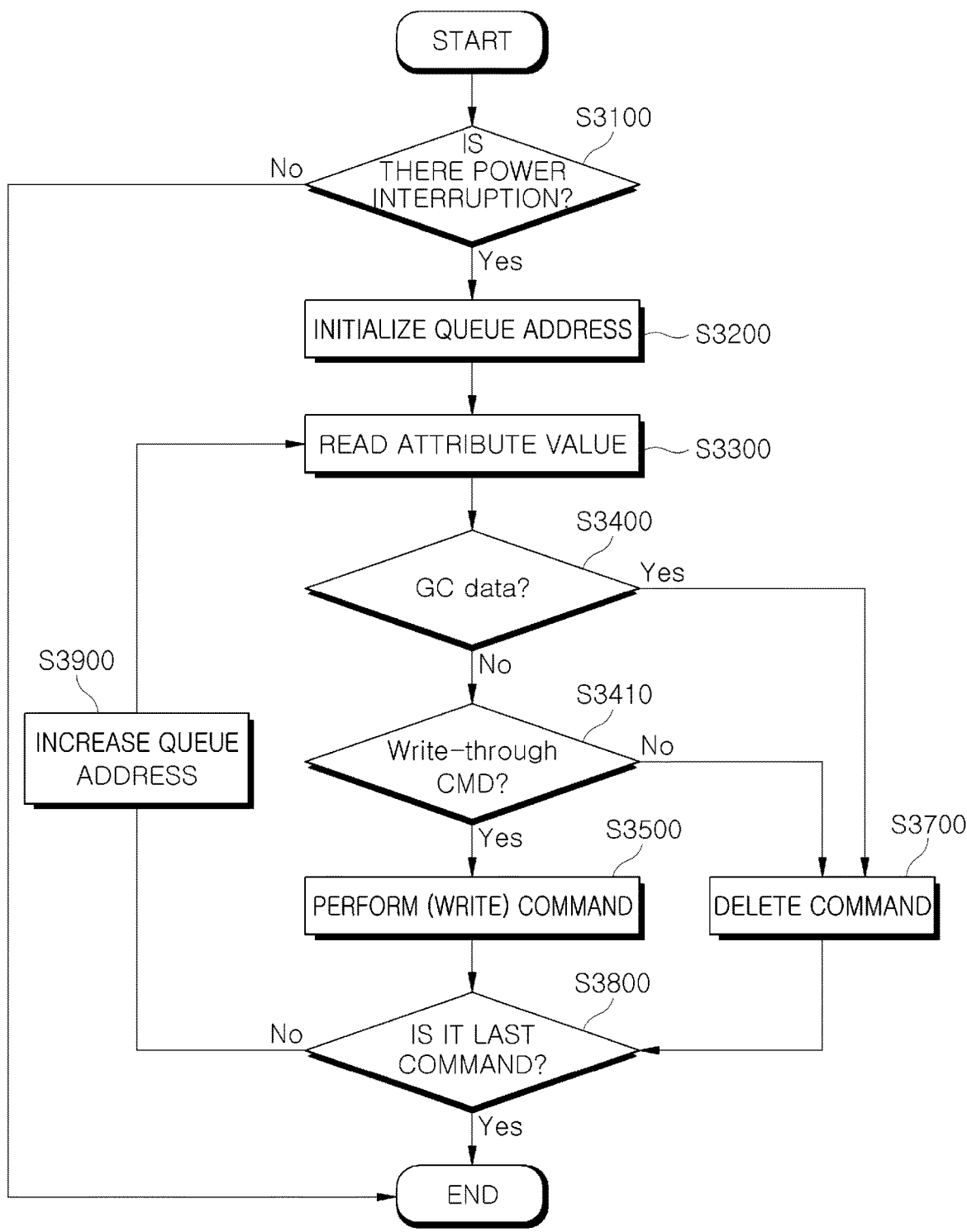
FIG. 11 is a flowchart illustrating operation of a control unit according to a further embodiment of the present invention.

FIG. 11 is an operation sequence of the control unit 1214 according to a further embodiment of the present invention.

The present embodiment is configured by adding Step S3410 of determining whether a current command is a write-through command which the host apparatus 1100 requests a reply to the embodiment of FIG. 9.

Write commands issued by the host apparatus 1100 include a write-back command which the host apparatus 1100 does not request notification of write completion and a write-through command which the host apparatus 1100 requests notification of write completion after a write operation is completed. The host apparatus 1100 may issue a write-through command, for example, when completion of a command is important as in financial transactions. In the present embodiment, when the current data is determined as not being garbage collection data in Step S3400, the control unit 1214 determines whether the current queue address is a write-through command or not at Step S3410. When the command is a write-through command (YES in Step S3410), the control unit 1214 performs the command in Step S3500. If not (NO in Step S3410), the control unit 1214 deletes the command from the command queue without performing the command at Step S3700.

In the embodiment described above, an example has been disclosed in which a determination of whether a command is a write-through command or not is made in Step S3410 after Step S3400 in which a determination of whether a write target data is garbage collection data or not is made. However, the scope of the invention is not limited thereto. For example, the determination of whether a command is a write-through command or not may be performed (Step S3410) first, and then the determination of whether the write target data is garbage collection data or not may be performed (Step S3400). Alternatively, the determination S3400 of whether the write target data is garbage collection data and the determination S3410 of whether the command is a write-through command may be simultaneously performed.

Therefore, according to the embodiment of the present invention, it is possible to reduce the number of commands to be executed for data storage, and thus it is possible to reduce the consumption of power that needs to be supplied by an auxiliary power supply when a power interruption event occurs.

While preferred embodiments of the present invention have been described above, it will be understood by those skilled in the art that various changes may be made without departing from the spirit or scope of the invention. Therefore, the scope of the present invention should not be limited to the preferred embodiments but should be defined by the following claims and their equivalents.

FIGS. 9 to 11 illustrates an exemplary operation in which, when a write target data to be written to a data storing apparatus is determined as being garbage collection data (YES in S1400, S2400, or S3400), the control unit 1214 deletes the command for the corresponding data as in S1700, S2700 or S3700. However, it is possible that the control unit 1214 may skip execution of the command for the corresponding data instead of deleting the command for the data from the command queue.

What is claimed is:

1. A method of storing data, the method being performed by a controller and comprising:
    storing an attribute value of first data to be written to a nonvolatile memory device in a command queue, the command queue including an attribute region in which attribute values of data, including the first data, are stored and a command region in which commands corresponding to the data are stored;
    determining whether the first data is garbage collection data or not based on the attribute value when a power interruption event occurs; and
    writing or not writing the first data to the nonvolatile memory device according to a result of the determination of whether the first data is garbage collection data or not,
    wherein, in the writing or not writing of the first data, when the first data is determined as being garbage collection data, the controller does not perform a first command corresponding to the first data and stored in the command queue but deletes the first command corresponding to the first data from the command queue.

2. The method according to claim 1, wherein in the writing of the first data, when the first data is determined as not being the garbage collection data, the controller performs the first command corresponding to the first data.

3. The method according to claim 1, wherein in the writing of the first data, when the first data is determined as being host data, the controller writes the first data to the nonvolatile memory device.

4. The method according to claim 1, further comprising:
    determining whether a garbage collection function is in process when the power interruption event occurs, before performing the determining of whether the first data is garbage collection data or not.

5. The method according to claim 4, wherein in the determining of whether the first data is garbage collection data or not, the controller determines whether the first data is garbage collection data when it is determined that the garbage collection function is not in process when the power interruption event occurs.

6. The method according to claim 1, wherein in the writing or not writing of the first data to the nonvolatile memory device, the controller writes or does not write the first data to the nonvolatile memory device according to a result of the determination of whether the first data is garbage collection data or not or a result of the determination of whether the first command corresponding to the first data is a write-through command or not.

7. The method according to claim 6, wherein when the first command is a write-through command and the first data is host data, the controller writes the first data to the nonvolatile memory device.

8. The method according to claim 1, further comprising:
    determining whether the first command corresponding to the first data is a last command in the command queue or not, after performing the writing of the first data to the nonvolatile memory device.

9. The method according to claim 8, further comprising: shifting to a next address in the command queue when the first command is not the last command.

10. The method according to claim 9, further comprising: storing an attribute value of second data to be written to the nonvolatile memory device in the command queue, the second data corresponding to the next address which is reached through the shifting; and determining whether the second data is garbage collection data or not, based on the attribute value of the second data, after performing the shifting to the next address.

11. The method according to claim 10, further comprising:

writing the second data to the nonvolatile memory device when the second data is determined as not being the garbage collection data.

12. The method according to claim 11, wherein when the second data is determined as being garbage collection data, the controller does not perform a second command corresponding the second data but deletes the second command from the command queue.

13. A data storing apparatus comprising:
a buffer memory device in which data is stored;
a nonvolatile memory device; and
a controller configured to write or not write the data stored in the buffer memory device to the nonvolatile memory device according to whether the data stored in the buffer memory device is garbage collection data or not when a power interruption occurs, wherein the controller includes a command queue including an attribute region in which an attribute value of the data is stored and a command region in which a command corresponding to the data is stored, wherein the controller determines whether the data is garbage collection data or not, based on the attribute value of the corresponding data, and wherein the controller does not perform a command corresponding the data when the data is garbage collection data.

14. The data storing apparatus according to claim 13, wherein when the data is not garbage collection data and when a command corresponding to the data is a write-through command, the controller writes the data to the nonvolatile memory device.

15. The data storing apparatus according to claim 13, where the buffer memory device is a dynamic random access memory (DRAM).

16. The data storing apparatus according to claim 13, wherein the data storing apparatus is a solid-state disk (SSD).

* * * * *